Patented Sept. 2, 1941

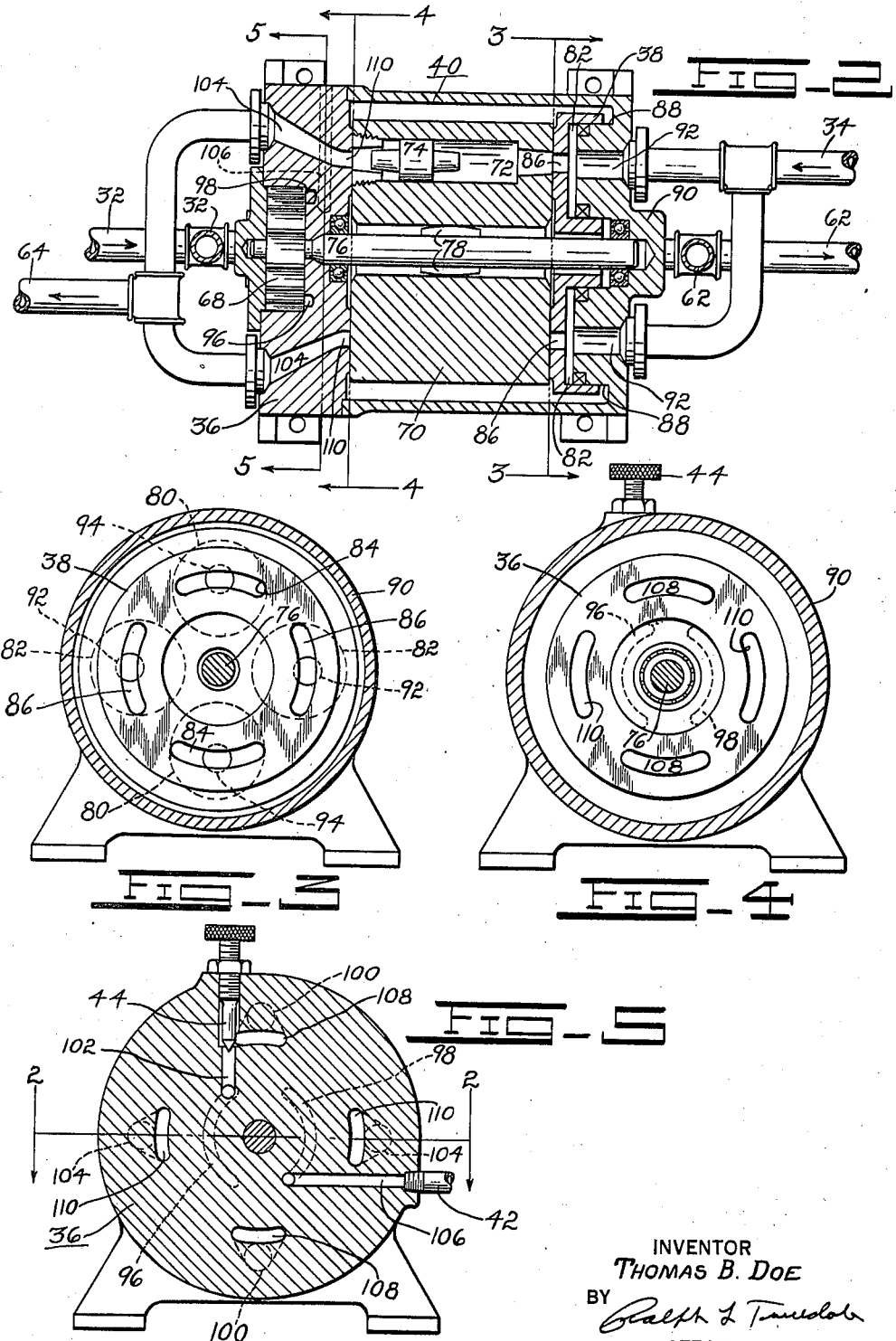

2,254,274

UNITED STATES PATENT OFFICE 2,254,274

METERING DEVICE

Thomas B. Doe, New York, N. Y., assignor to The Waterbury Tool Company, Waterbury, Conn., a corporation of Connecticut Application May 12, 1937, Serial No. 142,221

4 Claims. (Cl. 221—95)

This invention relates to metering devices for power transmissions, particularly to those for transmissions of the type comprising two or more fluid pressure energy translating devices one of which may function as a pump and another as a fluid motor.

An object of the present invention is to provide a hydraulic power transmission system wherein a pump supplies fluid at a substantially constant pressure to a fluid motor. The fluid motor can be automatically regulated to drive a load device at any desired speed against varying load torques by means of a metering device and control mechanism. The metering device is so constructed as to provide two pairs of inlet and outlet ports whereby an equal fluid pressure is provided in diametrically opposite ports thereby obtaining a balanced effect between cylinder and valve plate. By means of two pairs of inlet and outlet ports in the respective valve plates, the displacement is double that of a unit where only a single pair of ports are provided which will give greater variable speed range in many instances where it is desirable to provide some means for varying the speed of the fluid motor over a considerable range without steps.

Further objects and advantages of the present invention will be apparent from the following description, reference being had to the accompanying drawings wherein a preferred form of the present invention is clearly shown.

In the drawings:

Fig. 2 is a horizontal sectional view of a metering device and control mechanism forming one of the elements of the system of Fig. 1.

Fig. 3 is a cross section on line 3—3 of Fig. 2.

Fig. 4 is a cross section on line 4—4 of Fig. 2.

Fig. 5 is a cross section on line 5—5 of Fig. 2.

Figure 1:
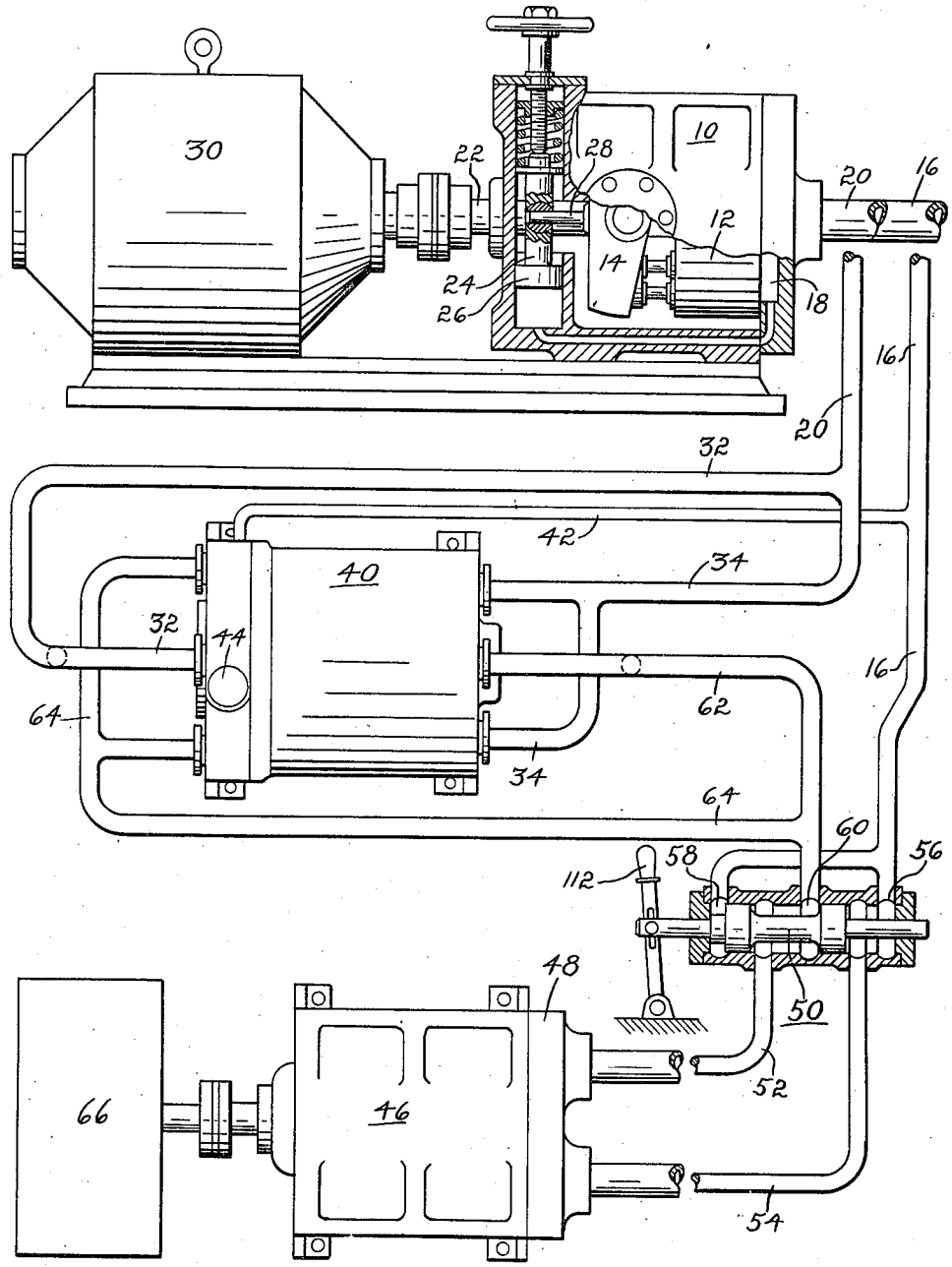
Fig. 1 is a diagrammatic view of a power transmission system incorporating a preferred form of the present invention.

Referring now to Fig. 1 there is illustrated a source of fluid pressure comprising a variable displacement pump 10 which may be of any suitable construction and is shown as of the well-known "Waterbury" type comprising a revolving cylinder barrel 12 having parallel cylinder bores within which pistons are reciprocated by means of a tilting box and socket ring assembly 14. Fluid is drawn into the cylinder bores from a return conduit 16 through an arcuate valve port and is delivered to an arcuate valve port 18 and pressure conduit 20. The quantity of fluid delivered is determined by the inclination of the tilting box 14 relative to a main shaft 22, the position of the tilting box being controlled by a constant pressure regulating mechanism 24 comprising a spring-loaded piston 26 which is connected to a tilting box operating stud 28 and operates to increase the displacement of the pump upon a decrease in pressure in the line 20 and to decrease the displacement of the pump upon an increase in pressure in the line 20.

The shaft 22 may be driven from a suitable prime mover, such as an electric motor 30. The conduit 20 branches off into conduits 32 and 34 which connect to valve plates 36 and 38 (Fig. 2), respectively, on either side of the metering device 40. The construction of the fluid motor 46 may be similar to that of the pump 10 except that in place of a tilting box the motor 46 is provided with a fixed angle box in which a socket ring is journalled and a cylinder barrel coacts with a valve plate 48 having a pair of arcuate valve ports to which are connected conduits 52 and 54 through which fluid is delivered to and expelled from the cylinder barrel. Conduits 52 and 54 are connected to a reverse valve 50. Ports 56 and 58 of the reverse valve 50 are connected through conduit 16 to the suction port of the pump 10. Port 60 is connected through conduits 62 and 64 to valve plates 38 and 36 of the metering device 40. The motor 46 drives an independent load device indicated diagrammatically at 66.

Referring now to Fig. 2 there is illustrated the fluid metering device 40 which includes a pilot motor 68 for operating the metering device. A cylinder barrel 70 is rotatably mounted to have each face abutting the face of valve plates 36 and 38. The cylinder barrel 70 is provided with a plurality of parallel longitudinal bores 72 within which free pistons 74 are reciprocably mounted. The barrel 70 is carried by a shaft 76, the two being keyed to one another by keys 78 for simultaneous rotation so as to permit a slight universal joint action to take care of possible misalignment between the axis of shaft 76 and the plane of the valve plates 36 and 38. Valve plate 38 has two pairs of cylindrical chambers 80 and 82 communicating with ports 84 and 86, respectively. The latter are adapted to be slidably received on cylindrical bosses 88 formed in a casing 90 of the metering device 40. Two pairs of conduits 92 and 94 connect the chambers 82 and 80 with branch conduits 34 and 62, respectively, leading to the main conduit 20 and valve port 60, respectively. Valve plate 36 has two pairs of arcuate valve ports 108 and 110 communicating by conduits 100 and 104 with conduits 32 and 64, respectively. Mounted within a suitable recess in valve plate 36 is the pilot motor 68 which can be of any suitable construction and is illustrated as of the well-known internal-external gear type having inlet and outlet ports 96 and 98. The pilot motor 68 is connected to an extension of the shaft 76 whereby the motor 68 may rotate the shaft 76 and cylinder barrel 70 at any desired speed. The motor 68 is supplied with fluid from conduit 100 through a branch conduit 102 (see Fig. 5) having an adjustable throttle valve 44 therein leading to the intake port 96. The outlet port 98 delivers fluid through passage 106 and conduit 42 to main line 16.

In operation the prime mover 30 is started causing the pump 10 to deliver fluid to conduit 20. The quantity delivered automatically varies to maintain a constant pressure in conduit 20 by the pressure regulating mechanism 24. The valve 44 may be opened to admit fluid to the pilot motor 68, thus causing the cylinder barrel 70 to revolve at a speed determined by the opening of the valve 44. In so doing it will be seen that as each bore 72 passes on to pressure ports 108 of valve member 36, its pistons 74 on opposite sides of cylinder barrel 70 will be pushed to the right in Fig. 2, and a corresponding quantity of fluid is discharged through the valve ports 84, branch conduits 62, port 60, reverse valve 50 and conduit 52 to motor 46. Likewise as each cylinder bore 72 passes on to pressure ports 86, fluid delivered from the pump 10 will move the pistons 74 to the left discharging a corresponding amount of fluid through the ports 110, to the branch conduit 64, port 60 of the reverse valve 50, and conduit 52 to motor 46. The quantity of fluid delivered to the cylinder barrel of fluid motor 46 through the metering device 40 is thus determined by the speed at which the cylinder barrel 70 revolves; which is determined by the setting of the throttle valve 44. It will be seen that the motor 46 and the load device 66 may be operated at any desired constant average speed regardless of varying load conditions inasmuch as the speed is determined by the setting of the throttle valve 44 which is independent of the pressure drop across the cylinders 72.

It will be noted that the metering device comprising the barrel 70 and its associated pistons and valve ports is so constructed as to avoid any direct transmission of torque to the shaft 76 due to fluid pressure differences across the lines 32—34 and 62—64. The torque required to turn the barrel 70 is thus independent of pressure maintained in the branch lines 32 and 34 and of back pressure in lines 62 and 64. The movable valve plate 38 is arranged to automatically take up clearance between the valve surfaces at the opposite ends of the barrel 70. The area of the cylindrical chambers 80 and 82 is such that the resultant of the axial fluid pressure forces effective on the valve plate 38 has a tendency to move the valve plate 38 to the left in Fig. 2. Reverse valve 50 which is shown as operated by hand lever 112 can reverse the pressure lines of motor 46 independently, without reversing the direction of rotation of the fluid metering device 40 or pump 10.

While the form of embodiment of the invention as herein disclosed, constitutes a preferred form, it is to be understood that other forms might be adopted, all coming within the scope of the claims which follow.

What is claimed is as follows:

1. A metering device operable to deliver fluid at an average rate proportional to the speed at which the device operates comprising a rotatable block having a plurality of cylinders therein with a distributing port at each end, freely slidable pistons in said cylinders, means forming inlet and outlet ports cooperating wtih one end of said cylinders, means forming inlet and outlet ports cooperating with the opposite ends of said cylinders, and in alignment with the outlet and inlet ports respectively at the one end of the cylinders, means for rotating said cylinder block, means for connecting the inlet ports to a common inlet duct and means for connecting the outlet ports to a common outlet duct.

2. A metering device operable to deliver fluid at an average rate proportional to the speed at which the device operates comprising a rotatable block having a plurality of cylinders therein with a distributing port at each end, freely slidable pistons in said cylinders, a conduit for supplying fluid to said device, a conduit receiving fluid from said device and stationary valve ports cooperating with distributing ports of the cylinders for alternately connecting the ports at opposite ends of each cylinder first to the supply conduit and receiving conduit respectively and then to the receiving conduit and supply conduit respectively.

3. A metering device operable to deliver fluid at an average rate proportional to the speed at which the device operates and in which the driving load is independent of the pressure drop across the device comprising a rotatable block having a plurality of cylinders therein with a distributing port at each end, freely slidable pistons in said cylinders, means forming a pair of inlet and outlet ports cooperating with the ports at one end of said cylinders, means forming a second pair of inlet and outlet ports cooperating with the ports at the opposite ends of said cylinders, means for rotating said cylinder block, means for connecting an inlet port of each pair with a common inlet duct, and means for connecting an outlet port of each pair with a common outlet duct.

4. A metering device operable to deliver fluid at an average rate proportional to the speed at which the device operates and in which the driving load is independent of the pressure drop across the device comprising a rotatable block having a plurality of parallel cylinders therein with a distributing port at each end, freely slidable pistons in said cylinders, a valve plate abutting one end of said cylinder block and having a pair of inlet and outlet ports cooperating with the ports at one end of said cylinders, a second valve plate abutting the other end of said cylinder block and having a pair of inlet and outlet ports cooperating with the ports at the opposite ends of said cylinders, one of said valve plates being axially movable toward said cylinder block, means for maintaining said valve plate in contact with the cylinder block and for maintaining the cylinder block in contact with the other valve plate, means for rotating said cylinder block, means for connecting an inlet port of each pair to a common inlet duct, and means for connecting an outlet port of each pair to a common outlet duct.

THOMAS B. DOE.